Patented Sept. 3, 1929.

1,726,768

UNITED STATES PATENT OFFICE.

SANFORD K. ROBINSON, OF CHICAGO, ILLINOIS, ASSIGNOR TO K-P-C COMPANY, OF CHICAGO, ILLINOIS, A CORPORATION OF ILLINOIS.

PREPARATION OF LACTIC SALTS.

No Drawing. Application filed April 24, 1925. Serial No. 25,678.

The invention relates to the preparation of lactic salts and has particular reference to the preparation of such salts from waste products of the dairy industry. Specifically it has an important application in recovering or rendering available for use, valuable materials present in whey.

The principal objects of the invention are to provide a process for the conversion, into usable form, of materials present in whey; to provide a process for converting the lactose or milk sugar content of sweet whey into a lactic salt, incidentally to provide a process of separating from the resulting lactic salt solution, other contained materials, such as casein and albumin; to provide a process for producing from whey a concentrated solution of a lactic salt of relatively high purity; to provide an improved material capable of being advantageously employed in the fluxing of cheese when remaking, pasteurizing or sterilizing the same, and in general to provide an improved, efficient process for the production of lactic salts and the utilization of same in the fluxing or emulsifying of cheese.

In the manufacture of cheese of various types, for example, cheddar, Swiss and brick, large quantities of whey are produced. At the present time such whey is of insignificant value and has substantially no use except as a food for hogs or other live-stock. It has so little value even for feed that in many cases, it is discharged into the sewer or in other cases is given back to the farmer free of charge for his labor in hauling it away.

Since the commercial introduction and development of the processes set forth in the Kraft patents, Reissue 14,777, 1,323,869 and 1,400,171 for the sterilizing, pasteurizing or remaking of cheese, particularly of the cheddar genus, it has been discovered that the process set forth in said patents can be practiced with greater facility if there be added to the cheese a small percentage of a fluxing or emulsifying ingredient. In this connection reference may be had to U. S. Patents Nos. 1,374,141 and 1,389,577 which described the use of sodium phosphate and sodium citrate for this purpose. I have discovered that the salts of lactic acid, for example, sodium lactate can also be utilized in this connection as a fluxing ingredient. Incidentally, my experience indicates that such salts are more efficient and produce a better product than the emulsifying or fluxing agents developed by prior inventors. For instance, where the cheese is put up in the loaf form as described in the last mentioned Kraft patent, the use of my improved fluxing ingredient will improve the slicing quality of the cheese considerably as compared with such loaf cheese prepared by the aid of the citrate or phosphate flux. Incidentally, since my improved flux is prepared from the whey or residue resulting from the manufacture of the original cheese, the use of a lactic salt is not subject to the possible criticism that the cheese contains a foreign chemical or adulterant.

Although my invention may be capable of modification in certain of its details, and may be capable of other applications which will be apparent to those skilled in the art, I shall describe only a single application thereof as used in connection with the preparation of sodium lactate from sweet whey resulting from the manufacture of cheese of the Swiss type.

After whatever contained or residual fat has been removed from the sweet whey by a centrifugal or other process, the sweet whey is placed in suitable tanks and preferably inoculated with an organism for producing fermentation of the lactose in the whey solution. Different organisms may be employed for this purpose. For example, I may employ a streptococcus organism such as streptococcus lacticus in which case I prefer to keep the temperature of the vat at approximately 80° F. during the entire fermentation process. If on the other hand, I employ an organism such as bulgaricus, the preferred temperature is about 105° F. Where the whey already contains the necessary bacteria, inoculation may be dispensed with.

As the fermentation develops and proceeds, the milk sugar or lactose is converted into lactic acid. The rising acidity of the liquor I have found, tends to retard the fermentation process and therefore, from time to time, as the fermentation proceeds, I prefer to neutralize the acidity by adding an alkali. Ordinarily the fermentation process is carried on for three or four days, at the end of which time, substantially all of the lactose has been converted into lactic acid. It will ordinarily be found sufficient to neutralize the acidity of the liquid about twice every twenty-four hours during the fermentation period, although if desired, more frequent neutralization may be effected.

Depending upon the particular lactic salt which I desire to form the end product, I select as a neutralizing alkali, that alkali which will combine with the lactic acid to form such salt. For example, if sodium lactate is desired, I prefer to neutralize the acidity of the liquid with sodium hydroxide, or I can use a carbonate of sodium as an alkali. (I use the term alkali in its generic sense as meaning anything which will neutralize an acid.)

When the fermentation is complete so far as practical, the resulting liquid is finally neutralized with the preferred alkali, in this instance sodium hydroxide. The liquid is conducted into pans where it is evaporated. In order to insure a high quality product and to prevent spoilage or deterioration of same, I prefer to evaporate under vacuum or partial vacuum so that the evaporation is conducted at a relatively low temperature, for example, not more than about 160° F.

The evaporation is continued until there is formed a voluminous flocculent precipitate which consists of casein and albumin. When, after testing a sample of the filtered liquid, no further precipitate forms with continued evaporation, the precipitation of the solids (casein or albumin) may be deemed complete, and the contents of the evaporating pans are then filtered. This results in an end product consisting of a somewhat syrupy solution of sodium lactate, together with small percentages of other milk salts which were present in the original whey. After the filtration step this syrupy liquid may be used without further concentration, or if desired, it may be concentrated further until it contains as high as 65% of sodium lactate.

In utilizing the said lactic salt solution for the fluxing or emulsification of cheese as an aid in the practicing of the process set forth in the Kraft Patent 1,400,171 above referred to, I find it advantageous to use from 1½ to 2 pounds of the 65% syrup for each 100 pounds of cheese to be prepared or packaged. This is added to the ground up or comminuted cheese when the latter is reduced into the steam-jacketed mixing or blending kettle. As described in the said Kraft patent, I prefer to use a large kettle of two or three hundred pounds capacity, the kettle being equipped with revolving paddles or stirrers so that the cheese is continuously and vigorously agitated while the heat is being effected. Also, as is set forth in the said Kraft patent, I apply the heat gradually, so that a period of twenty or thirty minutes is required to raise the temperature of the contents of the kettle to the desired point, which in most cases, is between 135° and 155° F. At that point the heat is turned off and the blended cheese mass is discharged and packaged as described in said patent.

In certain cases, particularly when the blending and packaging of the cheese is effected near the cheese factory where the whey is produced as a by-product, the syrup may be used in its dilute condition immediately after the precipitate has been filtered off and without the necessity of further concentrating it to 65% strength. Obviously, in that case, a greater volume of the dilute syrup must be added to the cheese, but in most cases this is no disadvantage as some water is usually added to the cheese in any case, for the purpose of compensating for water lost by evaporation from the kettle and also to still further facilitate the practicing of the blending process.

Furthermore, if desired, the filtration step itself may be completely omitted so that the liquid when used as an emulsifier or flux will contain also, the albumin and casein precipitate. As these solids are in themselves, valuable foods, their presence in the blended cheese is by no means objectionable.

Since the described details of my invention are illustrative of only a single application thereof, it will be obvious that the scope thereof should be determined by reference to the appended claims, said claims being construed as broadly as possible, consistent with the state of the art.

I claim as my invention:

1. The improvement in the art of producing lactic salts, which consists in fermenting whey to produce a liquid containing lactic acid in solution, treating the solution with an alkali which will combine with the lactic acid to form the particular lactic salt desired, then evaporating the solution to precipitate unwanted solids, and then removing the precipitate.

2. The improvement in the art of producing lactic salts, which consists in first fermenting whey to produce a liquid containing lactic acid in solution, and then treating the solution with an alkali which will combine with the lactic acid to form the particular lactic salt desired, the said alkali being added from time to time during the fermentation period thereby reducing the acidity of the solution and preventing retardation of the fermentation, then evaporating the solution to precipitate unwanted solids, and removing the precipitate.

3. The improvement in the art of producing lactic salts which consists in inoculating whey with an organism which will act upon the lactose to produce lactic acid, treating the solution from time to time during the fermentation period with an alkali which will combine with the lactic acid to form a solution of the particular lactic salt desired, then evaporating the solution to precipitate unwanted solids, and then removing the precipitate.

4. The improvement in the art of producing as an end product a solution of a lactic salt which consists in fermenting whey to produce lactic acid, treating the solution from time to time during the fermentation period with an alkali which will combine with the lactic acid to form a solution of the particular lactic salt desired, then evaporating the solution to precipitate unwanted solids, and then removing the precipitate.

SANFORD K. ROBINSON.

CERTIFICATE OF CORRECTION.

Patent No. 1,726,768.     Granted September 3, 1929, to

SANFORD K. ROBINSON.

It is hereby certified that the above numbered patent was erroneously issued to "K-P-C Company", whereas said patent should have been issued to "Kraft-Phenix Cheese Corporation, of Chicago, Illinois, a Corporation of Illinois", as assignee of the entire interest in said invention, as shown by the records of assignments in this office; and that the said Letters Patent should be read with this correction therein that the same may conform to the record of the case in the Patent Office.

Signed and sealed this 1st day of October, A. D. 1929.

M. J. Moore,
Acting Commissioner of Patents.

(Seal)

unwanted solids, and then removing the precipitate.

4. The improvement in the art of producing as an end product a solution of a lactic salt which consists in fermenting whey to produce lactic acid, treating the solution from time to time during the fermentation period with an alkali which will combine with the lactic acid to form a solution of the particular lactic salt desired, then evaporating the solution to precipitate unwanted solids, and then removing the precipitate.

SANFORD K. ROBINSON.

CERTIFICATE OF CORRECTION.

Patent No. 1,726,768.            Granted September 3, 1929, to

SANFORD K. ROBINSON.

It is hereby certified that the above numbered patent was erroneously issued to "K-P-C Company", whereas said patent should have been issued to "Kraft-Phenix Cheese Corporation, of Chicago, Illinois, a Corporation of Illinois", as assignee of the entire interest in said invention, as shown by the records of assignments in this office; and that the said Letters Patent should be read with this correction therein that the same may conform to the record of the case in the Patent Office.

Signed and sealed this 1st day of October, A. D. 1929.

(Seal)

M. J. Moore,
Acting Commissioner of Patents.